United States Patent
Kim et al.

(10) Patent No.: US 10,197,905 B2
(45) Date of Patent: Feb. 5, 2019

(54) REFLECTIVE SCREEN, DISPLAY HAVING THE SAME AND METHOD FOR MANUFACTURING REFLECTIVE SCREEN

(71) Applicant: LG ELECTRONICS INC., Seoul (KR)

(72) Inventors: Young Sung Kim, Seoul (KR); Sung Tae Kim, Seoul (KR); Seung Gyu Lee, Seoul (KR); Jin Beom Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/110,816

(22) PCT Filed: Dec. 31, 2014

(86) PCT No.: PCT/KR2014/013123
§ 371 (c)(1),
(2) Date: Jul. 11, 2016

(87) PCT Pub. No.: WO2015/108295
PCT Pub. Date: Jul. 23, 2015

(65) Prior Publication Data
US 2016/0334697 A1    Nov. 17, 2016

(30) Foreign Application Priority Data

Jan. 15, 2014  (KR) .................. 10-2014-0004965
Feb. 13, 2014  (KR) .................. 10-2014-0016415
Feb. 13, 2014  (KR) .................. 10-2014-0016417

(51) Int. Cl.
*G03B 21/602*   (2014.01)
*G03B 21/60*    (2014.01)
(Continued)

(52) U.S. Cl.
CPC ........... *G03B 21/602* (2013.01); *B05D 5/063* (2013.01); *G02B 1/041* (2013.01); *G02B 1/14* (2015.01);
(Continued)

(58) Field of Classification Search
CPC ....... G03B 21/56; G03B 21/60; G03B 21/602
(Continued)

(56) References Cited

U.S. PATENT DOCUMENTS 3,454,687 A * 7/1969 Ciofani ................. B29C 47/885
264/1.6
8,288,021 B2 * 10/2012 Funakubo ................ B22F 1/02
428/401
(Continued)

FOREIGN PATENT DOCUMENTS

CN         1725104       1/2006
CN      201210209 Y      3/2009
(Continued)

OTHER PUBLICATIONS

Machine Translation of JP2013-218073 Oct. 24, 2013.*
(Continued)

*Primary Examiner* — Christopher E Mahoney
(74) *Attorney, Agent, or Firm* — Ked & Associates, LLP (57) ABSTRACT

A reflective screen to display an image incident from the singlefocus projector is provided. The reflective screen may include a base layer; a fresnellens layer formed on a rear surface of the base layer and mixed with a color particle; a reflective layer formed on a rear surface of the fresnellens layer; and a rear surface protective layer coupled to a rear surface of the reflective layer. The reflective screen may provide a high quality image by reducing the layer structure to enhance the brightness.

6 Claims, 10 Drawing Sheets

(51) Int. Cl.
*G02B 1/14* (2015.01)
*B05D 5/06* (2006.01)
*G02B 1/04* (2006.01)
*G02B 3/08* (2006.01)
*G02B 5/02* (2006.01)
*G02B 5/08* (2006.01)

(52) U.S. Cl.
CPC ............. *G02B 3/08* (2013.01); *G02B 5/0242* (2013.01); *G02B 5/0284* (2013.01); *G02B 5/0808* (2013.01); *G03B 21/60* (2013.01)

(58) Field of Classification Search
USPC .......................... 248/452, 459; 359/452, 459
See application file for complete search history.

(56) References Cited

U.S. PATENT DOCUMENTS

| | | | | |
|---|---|---|---|---|
| 8,992,050 | B1* | 3/2015 | Yuan | G03B 21/14 359/618 |
| 2002/0163719 | A1* | 11/2002 | Ma | G03B 21/60 359/443 |
| 2008/0297895 | A1* | 12/2008 | Fujita | G03B 21/60 359/459 |
| 2012/0206800 | A1* | 8/2012 | Petersen | G03B 21/604 359/449 |
| 2012/0224150 | A1* | 9/2012 | Liu | G03B 21/56 353/29 |
| 2013/0003175 | A1* | 1/2013 | Kenmochi | G03B 21/604 359/452 |
| 2015/0286125 | A1* | 10/2015 | Powell | G03B 21/60 359/443 |
| 2015/0370156 | A1* | 12/2015 | Kim | G03B 21/60 359/458 |

FOREIGN PATENT DOCUMENTS

| | | |
|---|---|---|
| CN | 102221771 | 10/2011 |
| CN | 103293575 | 9/2013 |
| JP | H 05-011346 | 1/1993 |
| JP | 2008-256930 | 10/2008 |
| JP | 2011-219807 | 11/2011 |
| JP | 2013-218073 | 10/2013 |
| KR | 10-2012-0124204 | 11/2012 |
| WO | WO 2012/108718 | 8/2012 |

OTHER PUBLICATIONS

Chinese Office Action dated Mar. 17, 2017 issued in Application No. 201610224187.2.
Chinese Office Action dated Jun. 29, 2016 issued in Application No. 201510009698.8.
International Search Report and Written Opinion dated Mar. 30, 2015 issued in Application No. PCT/KR2014/013123.
Samsung; "Discussion on the maximum number of aggregated cells"; 3GPP TSG RAN WG1; Meeting No. 69; Prague, Czech Republic; May 21-25, 2012; pp. 1-3; R1-122219.

* cited by examiner

REFLECTIVE SCREEN, DISPLAY HAVING THE SAME AND METHOD FOR MANUFACTURING REFLECTIVE SCREEN

CROSS-REFERENCE TO RELATED PATENT APPLICATIONS

This application is a U.S. National Stage Application under 35 U.S.C. § 371 of PCT Application No. PCT/KR2014/013123, filed Dec. 31, 2014, which claims priority to Korean Patent Application Nos. 10-2014-0004965, filed on Jan. 15, 2014, 10-2014-0016415, filed on Feb. 13, 2014 and 10-2014-0016417, filed Feb. 13, 2014, whose entire disclosures are hereby incorporated by reference.

TECHNICAL FIELD

The present disclosure relates to a screen for a projector. More specifically, the present disclosure relates to a reflective screen capable of providing an image quality of high brightness, a display device having the same, and a method for manufacturing the reflective screen.

BACKGROUND ART

A data projector is widely used as an image projecting device to reflect images such as a PC screen, a video image, or an image data stored in a memory card to a screen. The projector commonly uses a method to display a colorimage by concentrating a light emitted from a light source to a DMD (Digital Micromirror Device) or a quartz plate.

Recently, a projector with a 50 cm-distance between a light source and a screen is being developed as a projector using a laser light source capable of realizing a large screen over 100 inches. The projector may overcome the limit of the installation space, because the distance between a screen fixed to the wall and a projector including a light source device may be arranged closer. In addition, the projector has an advantage of realizing a large screen over 100 inches which is hardly realizable by a LCD or an OLED.

The screen used in such projector tends to have a larger incident angle of the light source with respect to the screen compared to the conventional projector, insomuch as the distance between the projector and the screen. Thus, a reflective screen is used in response to a large incident angle, and demands on enhanced image quality.

The reflective screen has a layer structure laminated by various layers including reflective layers. The layer structure may make a screen thicker to disable roll-up. Thus, it is disadvantageous for storage, accommodation, and transportation.

In addition, a loss may occur during the process where the light emitted from the projector arrives at the reflective layer and is reflected again from the reflective layer. Therefore, there are problems such as declining contrast, irregular brightness distribution at a front surface, or narrow viewing angle, especially in a bright interior.

Meanwhile, a hard coating is performed on the outermost part exposed outside, because hardness of the screen surface is not high due to characteristics of materials used for manufacture of the screen. The hard coating has an advantage of reinforcing the surface strength of the screen. However, the reflective screen may reflect objects in surroundings like a mirror, or may reflect a person passing by in front of the screen. In addition, the reflective screen may require a lot of manufacturing processes and cost, because the reflective screen realizes an optical screen structure composed of a plurality of layers. In addition, the 'flash on the ceiling' phenomenon where the image emitted from the projector is reflected on the screen to show on the ceiling has a problem of causing inconvenience to the viewers. Therefore, an improvement to this situation is required.

DISCLOSURE OF INVENTION

Technical Problem

In order to solve the problems in the above, an object of the present disclosure is to provide a flexible projector reflective screen capable to wind on a roll.

Another object of the present disclosure is to provide a reflective screen of which brightness is improved by reducing the number of layers in the layer structure.

Still another object of the present disclosure is to provide a reflective screen capable to reduce the manufacturing cost, and to minimize the 'flash on the ceiling' phenomenon when used.

In addition, still another object of the present disclosure is to provide a display device having a reflective screen.

In addition, still another object of the present disclosure is to provide a method for manufacturing a reflective screen.

Solution to Problem

In a general aspect of the present of the present disclosure, there is provided a reflective screen comprising: a lens layer formed with an inclined plane at a rear surface of the lens layer; and a reflective layer formed on the inclined plane of the lens layer, wherein the reflective layer is formed whereby a metal flake with high aspect ratio is coated on the fresnel lens layer.

In some exemplary embodiments of the present disclosure, an aspect ratio of the metal flake may be above 100.

In some exemplary embodiments of the present disclosure, the metal flake may be made of an aluminum material.

In some exemplary embodiments of the present disclosure, the reflective screen may further include a rear surface coating layer laminated to cover the reflective layer and a surface protective layer laminated to cover the diffusion layer may be.

In some exemplary embodiments of the present disclosure, the lens layer may be formed of a fresnel lens of which center is disposed in a lower part.

In another general aspect of the present disclosure, there is provided a method for manufacturing a reflective screen, the method comprising: forming a reflective layer by coating a spray solution on an inclined plane formed on a rear surface of a fresnel lens layer; and laminating a diffusion layer on a front surface of the fresnel lens layer.

In some exemplary embodiments of the present disclosure, the spray solution may include forming a metal film by laminating the metal film on a surface of a resin, drying the metal film and removing the resin, forming a metal flake by pulverizing the metal film, and mixing the metal flake with a solvent.

In some exemplary embodiments of the present disclosure, the solvent may include a binder, and the binder may be selected from a cellulose group consisting of CAB (Cellulose Acetate Butyrate) and NC (Nitrocellulose), or an urethane group.

In some exemplary embodiments of the present disclosure, the spray solution may contain a content of the metal flake in a ratio of 10 to 15%.

In some exemplary embodiments of the present disclosure, the solvent may include a polar solvent or a lubricant.

In still another general aspect of the present disclosure, there is a reflective screen, comprising: a lens base layer made of a synthetic resin in a shape of film; a lens main layer laminated on a surface of the lens base layer and mixed with a color particle, wherein an inclined plane is formed on a rear surface of the lens main layer; and a reflective layer formed on a rear surface of the lens main layer.

In some exemplary embodiments of the present disclosure, the reflective screen may further include a diffusion bead mixed with the lens main layer.

In some exemplary embodiments of the present disclosure, a reflective index difference between the diffusion bead and a synthetic resin forming the lens base layer or a lens resin forming the lens main layer may be above 0.03.

In some exemplary embodiments of the present disclosure, the lens main layer may include an urethane acrylate ingredient, and the diffusion bead may include a polymethyl methacrylate (PMMA) ingredient.

In some exemplary embodiments of the present disclosure, a scattering ratio (amount of scattered light/amount of incident light) of the lens main layer may be above 0.8.

In some exemplary embodiments of the present disclosure, the reflective screen may further include a diffusion bead mixed with the lens base layer.

In some exemplary embodiments of the present disclosure, the lens base layer may be formed by coating a resin including the diffusion bead on a temporary base layer, and by removing the temporary base layer.

In some exemplary embodiments of the present disclosure, a thickness of the lens base layer may be above 100 μm.

In some exemplary embodiments of the present disclosure, the color particle mixed with the lens main layer may be of nano-sized carbon black, and the lens main layer may be formed by mixing an urethane acrylate resin with the carbon black particle and a dispersing agent.

In still another general aspect of the present disclosure, there is provided a method for manufacturing a reflective screen, the method comprising: forming a lens base layer made of a synthetic resin in a shape of film; adding a color particle to a lens resin to form a lens main layer; forming a lens main layer wherein an inclined plane is formed on a rear surface of the lens main layer, by coating the lens resin on a surface of the lens base layer; forming a reflective layer on a rear surface of the lens main layer; and mixing a diffusion bead with the lens base layer or the lens main layer, during at least one of the forming the lens base layer or forming the lens main layer.

In some exemplary embodiments of the present disclosure, the adding a color particle to the lens resin may include adding a diffusion bead to the lens resin.

In some exemplary embodiments of the present disclosure, the forming the lens base layer may include adding a diffusion bead to a diffusion resin, coating the diffusion resin on a temporary base layer, hardening the diffusion resin, and separating the temporary base layer.

In some exemplary embodiments of the present disclosure, a reflective index difference between a synthetic resin forming the lens base layer and a lens resin forming the lens main layer may be above 0.03.

In still another general aspect of the present disclosure, there is provide a reflective screen comprising: a lens layer, wherein an inclined plane is formed on a rear surface of the lens layer; and a reflective layer formed on the inclined plane of the lens layer; and a surface protective layer formed on an outer peripheral surface of a front surface side in the lens layer, wherein an uneven concavo-convex part is formed on a surface of the reflective layer.

In some exemplary embodiments of the present disclosure, the reflective layer may be made of an aluminum material.

In some exemplary embodiments of the present disclosure, the surface protective layer may be formed by a wet coating.

In some exemplary embodiments of the present disclosure, the concavo-convex part of the surface protective layer may be formed by mold shaping a resin material having plasticity.

In some exemplary embodiments of the present disclosure, the surface protective layer may include inside thereof an impurity to diffuse a light, and the concavo-convex part of the surface protective layer may be formed by arranging the impurity particle on a surface of the surface protective layer.

In still another general aspect of the present disclosure, there is provided a display device comprising: a projector composed by either one of a CRT (Cathode Ray Tube) projection method, LCD (Liquid Crystal Display) projection method, LCoS (Liquid Crystal On Silicon) projection method, or a DLP (Digital Light Processing) projection method; and a reflective screen to reflect an image from the projector according to the present disclosure.

Advantageous Effects of Invention

According to an exemplary embodiment of the present disclosure, the reflective screen may be rolled up while maintaining the current performance. Thus, it is advantageous for storage, custody, and transporting.

In addition, according to an exemplary embodiment of the present disclosure, the reflective screen may provide a high quality image by reducing the layer structure to enhance the brightness.

In addition, according to an exemplary embodiment of the present disclosure, the reflector screen may prevent the 'flash on the ceiling' phenomenon, because the outermost peripheral layer is formed as a diffusion layer in order to diffuse the light incident from the projector and the external lightings while maintaining the surface hardness equivalent to the conventional projector screen.

Effects of the present disclosure are not limited to the above-mentioned effects. Other effects which are not mentioned may be clearly understandable for persons who skilled in the art of the present invention from the following description.

BEST MODE FOR CARRYING OUT THE INVENTION

Hereinafter, referring to enclosed figures and descriptions, a reflective screen according to an exemplary embodiment of the present disclosure, a display device having the reflective screen, and a method for manufacturing the reflective screen will be described. However, figures illustrated and descriptions mentioned in the below are only for exemplary embodiments among various method of describing features of the present disclosure. Therefore, the present disclosure is not limited to the figures illustrated and descriptions mentioned in the below.

In addition, the same number is given to an identical or corresponding component regardless of figure symbols, and the overlapped description thereof will be omitted. Scales and shapes of each component member illustrated for convenience of description may be exaggerated or minimized.

Meanwhile, the terms including ordinal numbers such as "first" or "second" may be used for description of various elements. However, the elements shall not be limited by such the terms. The terms are used merely to distinguish a particular element from another element.

Figure 1:
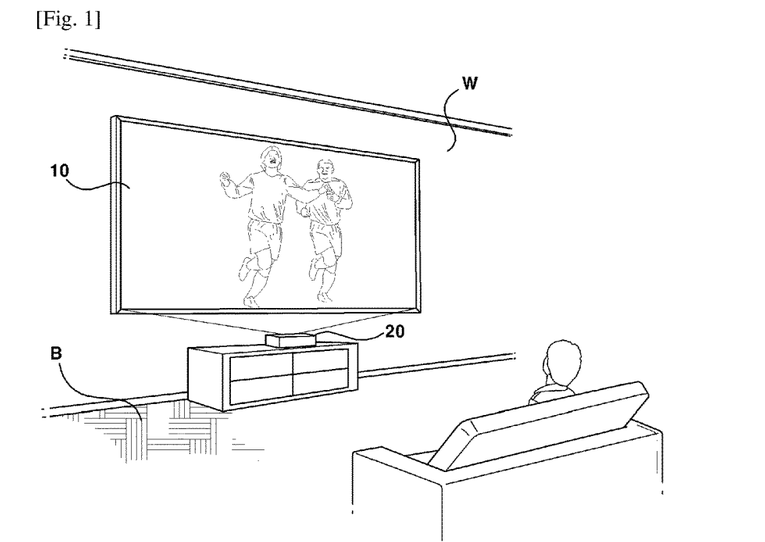
FIG. 1 is a perspective view illustrating a use state of a reflective screen according to an exemplary embodiment of the present disclosure.
Figure 2:
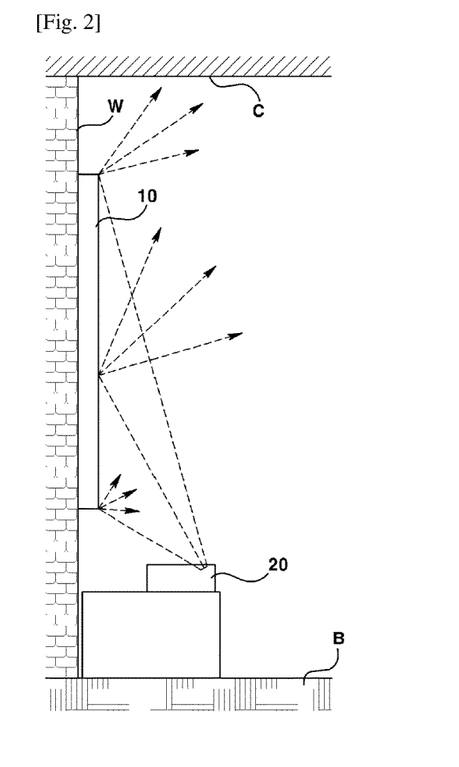
FIG. 2 is a lateral view illustrating a use state of a reflective screen according to an exemplary embodiment of the present disclosure.
Figure 3:
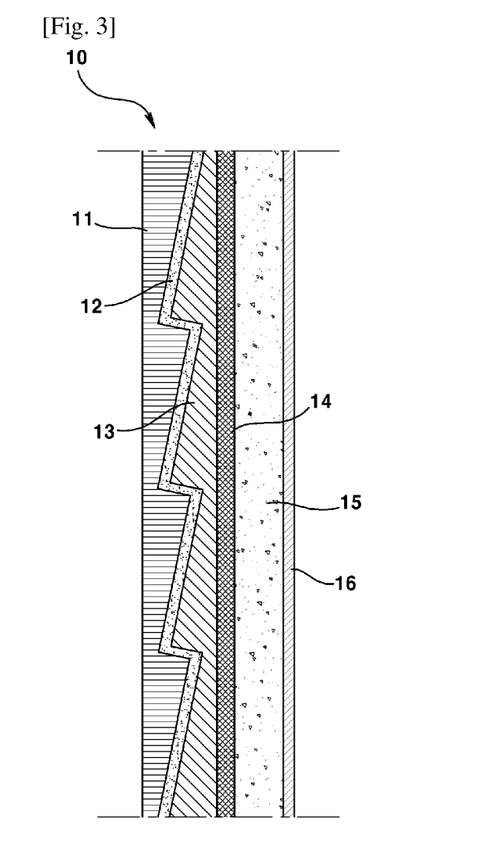
FIG. 3 is a view illustrating a reflection path of a light in a reflective screen according to an exemplary embodiment of the present disclosure.
Figure 4:
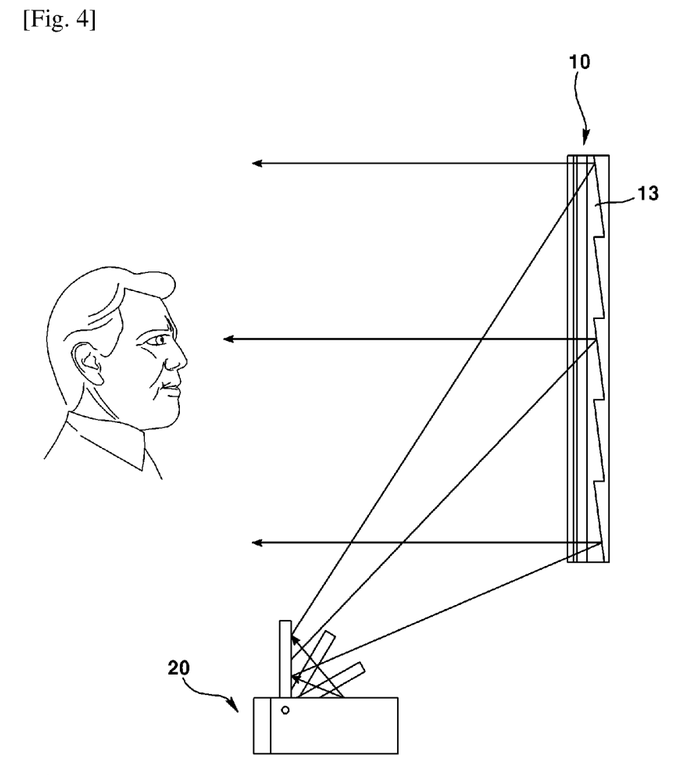
FIG. 4 is a sectional view of a reflective screen according to a first exemplary embodiment of the present disclosure.

FIG. 1 is a perspective view illustrating a use state of a reflective screen according to an exemplary embodiment of the present disclosure; FIG. 2 is a lateral view illustrating a use state of a reflective screen according to an exemplary embodiment of the present disclosure; FIG. 3 is a view illustrating a reflection path of a light in a reflective screen according to an exemplary embodiment of the present disclosure; and FIG. 4 is a sectional view of a reflective screen according to a first exemplary embodiment of the present disclosure.

FIG. 1 to 3 are exemplary views where the projector (20) emits an image from the reflective screen (10) in a short distance. Here, the reflective screen (10) may be corresponding to the reflective screen according to all of the first to fifth exemplary embodiments which will be described afterwards.

According to an exemplary embodiment of the present disclosure, the reflective screen (10) may output an image whereby a light emitted from the projector (20) fixed to the bottom surface (B) is formed as an image. As illustrated in the figure, the reflective screen (10) may be installed by being fixed on the wall surface (W).

The projector (20) is a display device which enables an images generated in an image element to be displayed on the reflective screen (10) through a projection lens.

The projector (20) may be composed by either one of a CRT (Cathode Ray Tube) projection method, LCD (Liquid Crystal Display) projection method, LCoS (Liquid Crystal On Silicon) projection method, or a DLP (Digital Light Processing) projection method, according to the projection method.

The CRT projection method is a method to emit an image signal amplified in a cathode ray tube to a screen. The CRT projection is also referred to as a beam projector. For the CRT projection method, there is a single tube type which is having a single CRT, and a triple tube type which is having three CRTs.

The LCD projection method applies electro-optical characteristic of the liquid crystal to the display device. Each of the light sources (red, green, and blue) from the lamp passes through the backlit liquid crystal panel and is composed into a single image through a polarizing prism, and is projected to the screen by being magnified.

In addition, the LCoS projection method is a method where a silicon wafer is used instead of the glass on the bottom part of the conventional LCD element and a LCoS (Liquid Crystal On Silicon) chip forming an electronic circuit is used above. In the LCoS (Liquid Crystal On Silicon) projection method, each of the light sources (red, green, and blue) from the lamp is reflected on a surface of the LCoS chip and is composed into a single image through a polarizing prism, and is projected to the screen by being magnified.

In addition, the DLP projection method uses a DMD (Digital Mirror Device) chip developed by TI (Texas Instrument) in the United States. In the DLP projection method, the light generated from the lamp passes through a color wheel and is reflected on the DMD chip, and is projected to the screen by being magnified.

However, the projector (20) according to an exemplary embodiment of the present disclosure is not limited to the aforementioned projection methods, and may include projectors with various projection methods. According to an exemplary embodiment of the present disclosure, the projector (20) which provides an image to the reflective screen (10) may be provided as a single focus projector with a front projection method.

According to an exemplary embodiment of the present disclosure, the projector (20) may be installed by being fixed at a position near to the reflective screen (10). As illustrated in FIGS. 1 and 2, the projector (20) may be installed on the bottom surface (B) around the reflective screen (10). However, the position where the projector is to be installed is not limited hereto. The projector (20) may also be installed on the ceiling surface in a range where a certain distance and angle condition is satisfied.

The image emitted from the projector (20) is incident form the lower part of the reflective screen (10). Then, the image is reflected to the front direction of the reflected screen (10) and is delivered to the viewer. When the image is incident from a short distance, the image may be reflected to the ceiling due to the wide incident angle. Thus, a lens layer (13) may be formed on the reflective screen (10), wherein the lens layer (13) may have an inclined plane, in order to prevent the image reflection to the ceiling and to lead the image to be reflected to the front direction of the reflected screen (10).

When the projector (20) has a short focus so as to emit the image from a close distance to the reflective screen (10), a difference between an incident angle from the upper part and an incident angle from the lower part may be large. In order that the image is all delivered to the view in front of the screen even though the incident angles may differ according to the positions of the reflective screen (10), the angle of inclined plane at the upper part of the lens layer (13) and the angle of inclined plane at the lower part of the lens layer (13) should be different each other.

The lens layer (13) may be realized by using a fresnel lens. The fresnel lens is a lens of which thickness is reduced by comparting a general lens to a plurality of inclined planes. The fresnel lens may concentrate or diffuse a light like a convex lens or a concave lens.

FIG. 3 is a view illustrating a reflection path of a light reflected from the reflective screen (10). The light emitted from the lower part may be incident to eyes of the viewer by being reflected on the lens layer (13) having a plurality of reflective planes inclined to the lower front directions.

Referring to FIG. 4, the reflective screen (10), which reflects the image incident from the projector (20) and delivers the image to the viewer, may include a lens layer (13), a reflective layer (12), a colored layer (14), a diffusion layer (15), a rear surface coating layer (11), and a surface protective layer (16).

The lens layer (13) may be formed by realizing a plurality of inclined planes using a UV (Ultra Violet) curable resin or a thermosetting resin such as polycarbonate or PMMA (Poly Methyl MethaAcrylate). The light emitted from the projector (20) passes through the lens layer (13) and may be reflected on the reflective layer to the front direction.

As illustrated in FIGS. 2 and 3, the incident angle of the light incident to the reflective screen (10) is different by the upper and the lower part. Thus, each of angles of the inclined planes of the lens layer (13) may be determined to minimize the image distortion according to the incident angle.

The lens layer (13) reflects and diffuses the light from the projector (20), and delivers the light to the viewer, along with the reflective layer (20). Here, the reflective layer (20) may be formed on the inclined plane of the lens layer (13). Although each of the inclined planes of the lens layer (13) is illustrated to have the same inclination in FIG. 4, each of the inclined planes may be formed to have different inclination by each height in reality, because the incident angles of the light form the projector (20) are different according to the positions. The lens layer (13) may be of a linear type or a lenticular type where the inclined plane toward the lower direction is extended to the horizontal direction and a plurality of the inclined planes are parallelly arranged in the vertical direction. In addition, a fresnel lens where a plurality of the inclined planes is forming a concentric circle may be used for the lens layer (13).

The brightness may be enhanced by forming the reflective layer (12) on the inclined plane of the lens layer (13). The brightness may be enhanced by 5.6 times, and the peak gain may be enhanced by 5.2 times, by forming the reflective layer (12) on the inclined plane of the lens layer (13). The reflective layer (12) may be made of an aluminum material, but not limited hereto. The material forming the reflective layer (12) may be substituted to other materials which have a high reflective characteristic and a good thermal resistance.

The reflective layer (12) may be formed in a rear surface, that is, on an inclined surface of the lens layer (13). The reflective layer (12) may be in a shape of a thin metal film. When the reflective layer (12) is formed by a vacuum coating method, the smooth surface may be realized. However, when bending the reflective screen (10) including the reflective layer (12) formed by a vacuum coating method, a crack may occur on the reflective layer (12) and the reflective layer (12) may be broken. Thus, the reflective layer (12) formed by a vacuum coating method is hardly applied to a roll-up typed screen. In addition, there is a problem that the reflective screen (10) should be kept spread and it is hard to move the reflective screen (10).

Otherwise, when spraying a metal particle having a high reflective characteristic by mixing with a solvent, the particle may form a reflective layer (12) by adhering to the surface of the lens layer (13). In this case, a crack does not occur even when bending the reflective screen (10), because the particles are separated from each other. However, referring to FIG. 5, which is a graph illustrating brightness by types of reflective layers (12), there is a problem that the brightness in the case where the reflective layer (12) is formed by a spray method (A) is reduced by 30% compared to the brightness in the case where the reflective layer (12) is formed by a vacuum coating method (C). This is because the reflective surface of the reflective layer (12) formed using a general spray solution is not evenly formed so that the brightness of the reflected light is reduced.

Figure 5:
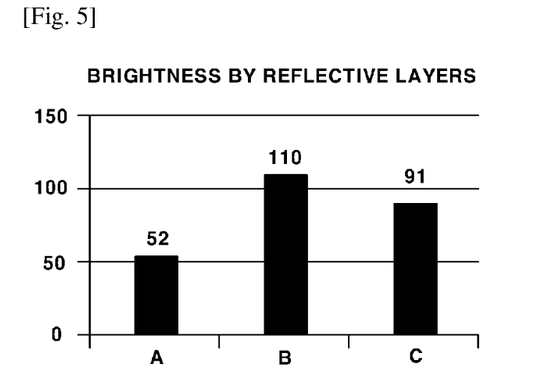
FIG. 5 is a graph illustrating brightness by types of reflective layers in a first exemplary embodiment of the present disclosure.

Therefore, it is advantageous to use a metal flake (121) with high aspect ratio as a metal particle used in the spray method. Here, the aspect ratio means a ratio between a length and a width of a particle. In the case where the reflective layer (12) is formed by spraying the metal flake (121) (B), the brightness is not reduced compared to the case where the reflective layer (12) is formed by a vacuum coating method (C), as shown in FIG. 5.

Figure 6:
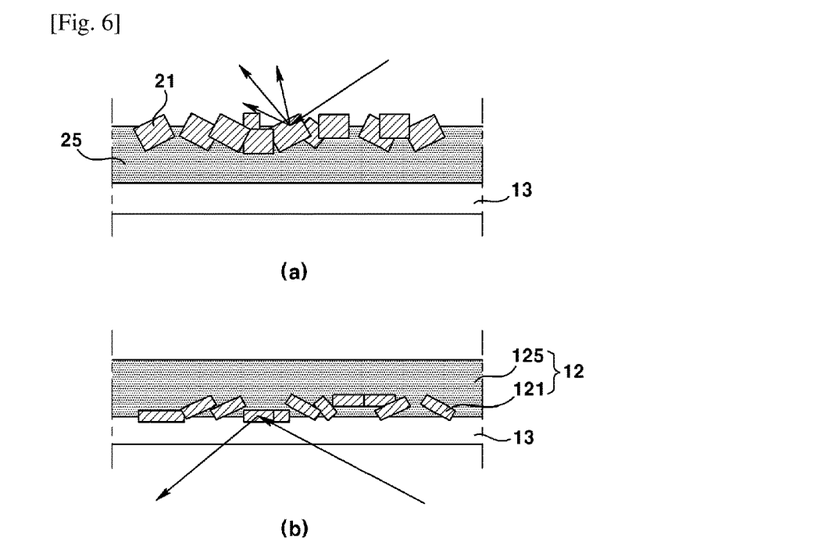
FIG. 6 is a view illustrating a reflective characteristic of a reflective layer according to aspect ratio of metal flake in a first exemplary embodiment of the present disclosure.

FIG. 6 is a view comparing a case where the reflective layer (12) is formed using a spray solution including general metal flakes and a case where the reflective layer (12) is formed using a spray solution including general metal flakes (121) with high aspect ratio. In the case (a), the reflective layer (12) formed using a spray solution including metal flakes with low aspect ratio (21) diffuses or scatters the light, because the reflective surface is not even. On the other hand, in the case (b) where the reflective layer (12) formed using a spray solution including metal flakes with high aspect ratio (121), the reflective surface is formed comparatively even, so that the diffused or scattered light is reduced, therefore the brightness of reflected light is enhanced.

Metals with high reflective characteristic may be used as the metal flake (121). For example, gold, silver, aluminum, and copper are metals with high reflective characteristic. Even though gold or silver has a good reflective characteristic in a range of visible light, aluminum may be preferable considering cost to efficacy. In addition, aluminum is lighter than copper. Thus, the metal flakes made of aluminum may be used.

Figure 7:
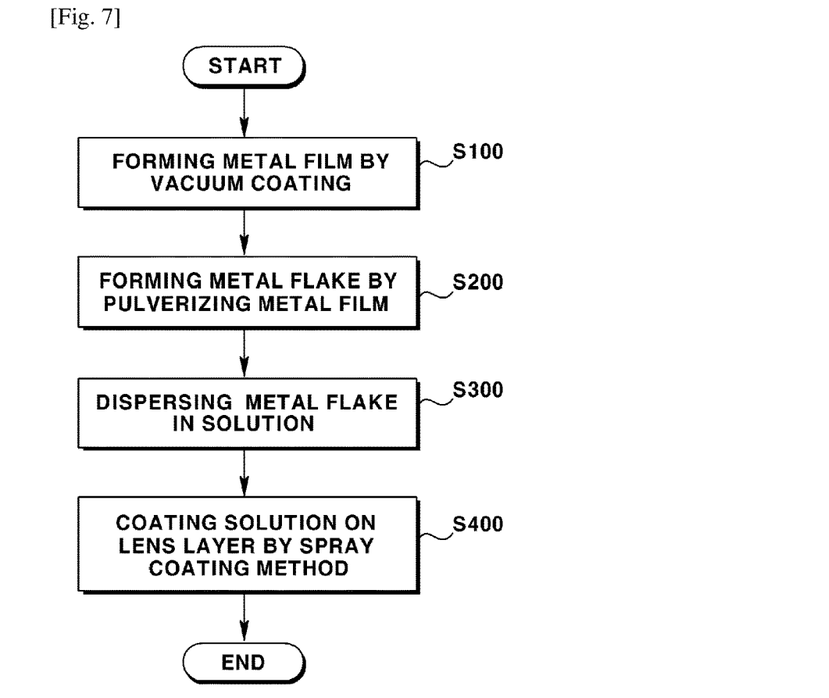
FIG. 7 is a flow chart illustrating a method for manufacturing a reflective screen according to a first exemplary embodiment of the present disclosure.

FIG. 7 is a flow chart illustrating the method to form the reflective layer (12) of the reflective screen according to the present disclosure. At first, a spray solution is formed by mixing metal flakes (121) having high aspect ratio with solvent (125) formed as a binder (S300). The reflective layer (12) may be formed (S400) by vaporizing the dissolvent in the solvent (125) after coating the spray solution on a rear surface of the lens layer (13) by a spray method. A cellulose group such as CAB (Cellulose Acetate Butyrate) and NC (Nitrocellulose), or an urethane group may be used as the binder.

The content of the metal flakes (121) mixed with the solvent (125) may be in a ratio of 10 to 15%. When the ratio of the metal flake (121) is higher than this range, there may be a problem that the solution is not spayed properly. When the ratio of the metal flake (121) is higher than this range, a hole may be generated on the reflective layer (12) due to lack of the metal flake (121).

In order to form metal flakes (121) with high aspect ratio, a thin metal film is formed on a resin by a vacuum coating method (S100). Then, the resin is removed and the metal film is pulverized (S200). When the metal film is pulverized too intensely, the aspect ratio of the metal flake (121) may become smaller. Thus, it is required to adjust the intensity of pulverization so as to adjust the size of aspect ratio of the metal flake (121).

Each of the metal flakes (121) manufactured through such process has a width of several decade nanometer and a length of 5~10 µm in amorphousness, with high aspect ratio of 100. In order to obtain a high reflective ratio, the aspect ratio of the metal flake (121) is required to be above 100.

When forming the reflective layer (12) with metal flakes (121) having such aspect ratio, a crack does not occur because the reflective screen (12) is bended along the boundary line between each of the metal flakes (121) when bending the reflective screen (12). The boundary line between the metal flakes (121) is not just an empty space, but filled with materials such as the binders mixed with the solvent. The boundary line has a superior flexibility compared to the metal flakes (121) so that the crack does not occur and the reflective screen (12) is not broken even when bending the reflective screen (12).

Figure 8:
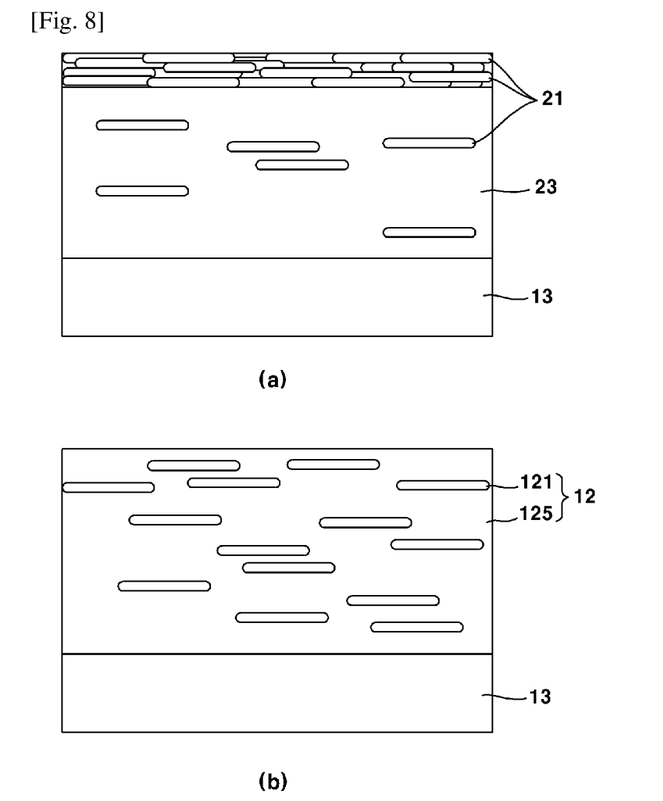
FIG. 8 is a view illustrating a mixing state of metal flake and a solvent in a first exemplary embodiment of the present disclosure.

FIG. 8 is a view illustrating a mixing state of metal flake and a solvent in a first exemplary embodiment of the present disclosure. Referring to FIG. 8, a case where the solvent (125) is a general solvent (a) and a case where the solvent (125) is a polar solvent or including a lubricant (b). In the case of a general solvent (a), the metal flakes (121) may be concentrated to the side apart from the lens layer (13) due to the surface tension. On the other hand, in the case where the where the solvent (125) is a polar solvent or including a lubricant (b), the metal flakes (121) may be well mixed with the solvent, so that the metal flakes (121) may be evenly distributed.

When the dissolvent is vaporized, the metal flakes (121) may be arranged closer to the lens layer (13) in the case (b) rather than in the case (a). When the metal flakes (121) are arranged adjacent to the lens layer (13), the distortion or scattering due to the remaining dissolvent or binder may be minimized.

A diffusion layer (15) may be additionally formed on a front surface of the lens layer (13). The diffusion layer (15) enables the light reflected from the lens layer (13) to be dispersed evenly on the front surface so that the viewer may appreciate the content of the screen, even though the view is not positioned precisely at the center of the screen. When the diffusion is not enough, the number of the viewers who can appreciate the reflective screen (10) may be limited. Therefore, in this respect, the diffusion layer (15) may be required.

A rear surface coating layer (11) may be laminated on a rear surface of the reflective screen (10) in order to protect the reflective layer (12). A surface protective layer (16) may be laminated on a front surface of the reflective screen (10). The rear surface coating layer (11) may perform a function to prevent oxidation of the reflective layer (12) by being formed as to surround the reflective layer (12). The rear surface coating layer may be of black color.

A colored layer (14) may be arranged between the diffusion layer (15) and the lens layer (13). The colored layer (14) is to enhance the contrast of the image emitted from the projector (20), and may also perform a function to form the color of the reflective screen (10) according to the present disclosure close to black. When such colored layer is provided, the color reproduction ability of black color with respect to the dark background may be enhanced. In addition, the degree of freedom in design of the product may be enhanced, because the reflective screen (10) may look close to black color when viewed by the viewer, even though the color of the reflective screen (10) is formed close to silver or grey due to the reflective layer (12). The colored layer (14) may be formed as a separate layer, as illustrated in FIG. 4. Otherwise, the colored layer (14) may be formed as to be integrated with the lens layer (13) or the diffusion layer (15) by injecting black particles to the lens layer (13) or the diffusion layer (15). This will be described in detail in the following another exemplary embodiment.

Figure 9:
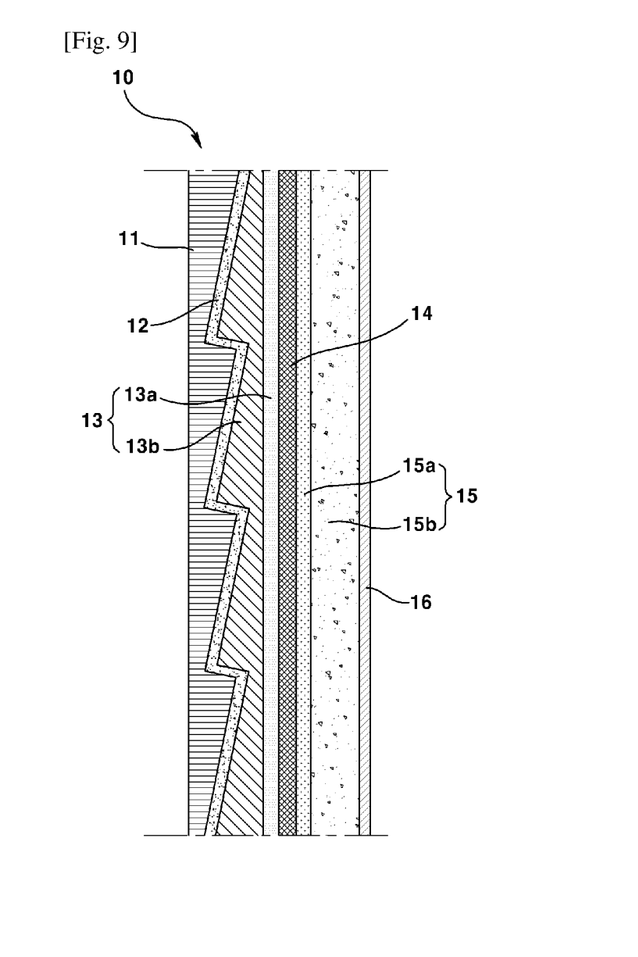
FIG. 9 is a sectional view illustrating a reflective screen according to a second exemplary embodiment of the preset disclosure.

FIG. 9 is a sectional view illustrating a reflective screen according to a second exemplary embodiment of the preset disclosure. The difference from the aforementioned first exemplary embodiment is that the lens layer (13) is divided into a lens base layer (13a) and a lens main layer (13b), and the diffusion layer (15) is divided into a diffusion base layer (15a) and a diffusion main layer (15b), respectively.

The lens main layer (13b) is made with a UV (Ultra Violet) curable resin. During the process, the lens base layer (13a) on which the UV curable resin is coated may be required. The lens base layer (13a) is a film-shaped member made of a synthetic resin. In order to support the UV curable resin, the lens base layer (13a) may formed in a thickness of above 100 µm by using a transparent member. The proper material for the lens base layer (13a) may be, for example, a PET (Polyethylene phthalate). However, the PET has a smooth surface. Thus, a primer process may be performed for the UV curable resin to adhere to the lens base layer (13a).

The lens layer (13) may be completed by forming the lens main layer (13b) by coating the synthetic resin on a rear surface of the lens base layer (13a). Hereinafter, the synthetic resin forming the lens main layer (13b) will be referred to as a lens resin. The same structure and method as those of the first exemplary embodiment of the present disclosure may be applied to the reflective layer (12) formed on a rear surface of the lens main layer (13b). Forming the rear surface layer (11) to protect the reflective layer (12) is also similar to the first exemplary embodiment of the present disclosure.

A diffusion layer (15) to diffuse the light reflected on the reflective layer (12) is disposed on a front of the lens layer (13). The diffusion layer (15) may be formed by using a resin mixed with diffusion beads, or may be formed by coating the diffusion beads on the surface after forming the layer using the resin. A diffusion base layer (15a) may be provided in order to form the diffusion layer (15) by coating the resin. The diffusion layer (15) may be formed by laminating a diffusion main layer (15b). The diffusion base layer may also be provided as a film-shaped synthetic resin member.

The reflective screen is manufactured by attaching the diffusion layer (15) on a front surface of the lens layer (13) with an adhesive. Here, a colored layer (14) may be interposed between the lens layer (13) and the diffusion layer (15), in order to clarify the dark colors. A surface protective layer (16) may be additionally formed on a front surface in order to protect the diffusion layer (15).

Generally, the lens base layer (13a) and the diffusion base layer (15a) have penetration ratio of around 90%. Therefore, the more base layers exists the less light may penetrate so that the brightness may be declined. Therefore, the layer structure of the reflective screen (10) is required to be simplified.

The following Table 1 shows brightness, black brightness, and contrast (C/R) of the reflective screen according to the number of the base layers. The brightness is a degree to express the bright colors, and the black brightness is a degree to express the dark colors, respectively. The larger the values of the brightness are, the clearer image may be provided. The high contrast ratio may become when can be obtained high brightness and low black brightness. The internal diffusion means a structure where the diffusion beads are mixed inside of the diffusion layer, and the surface diffusion means a structure where the diffusion beads are coated on the surface of the diffusion layer.

TABLE 1

| Division | Number of base layers | Brightness (nit) | Black Brightness (nit) | C/R |
|---|---|---|---|---|
| Internal diffusion | 2 | 128 | 1.58 | 81 |
| | 1 | 191 | 1.75 | 109 |
| Surface diffusion | 2 | 133 | 2.50 | 53 |
| | 1 | 177 | 2.71 | 67 |

As shown in the above TABLE 1, the values of brightness, black brightness, and contrast (C/R) is lower in the case where the number of the base layers is 2, rather than in the case where the number of the base layers is 1. That is, when the number of the base layers is 2, the penetration ratio is reduced so that the definition of the image reflected from the reflective screen is declined.

The second exemplary embodiment of FIG. 9 may also be affected by such declination of the definition. Therefore, consideration for reducing the number of base layers is required.

Figure 10:
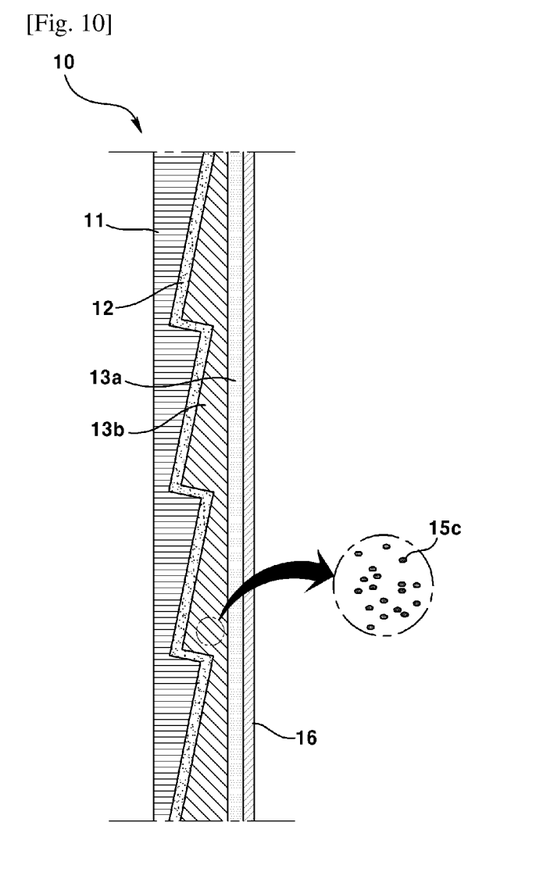
FIG. 10 is a sectional view illustrating a reflective screen according to a third exemplary embodiment of the preset disclosure.
Figure 11:
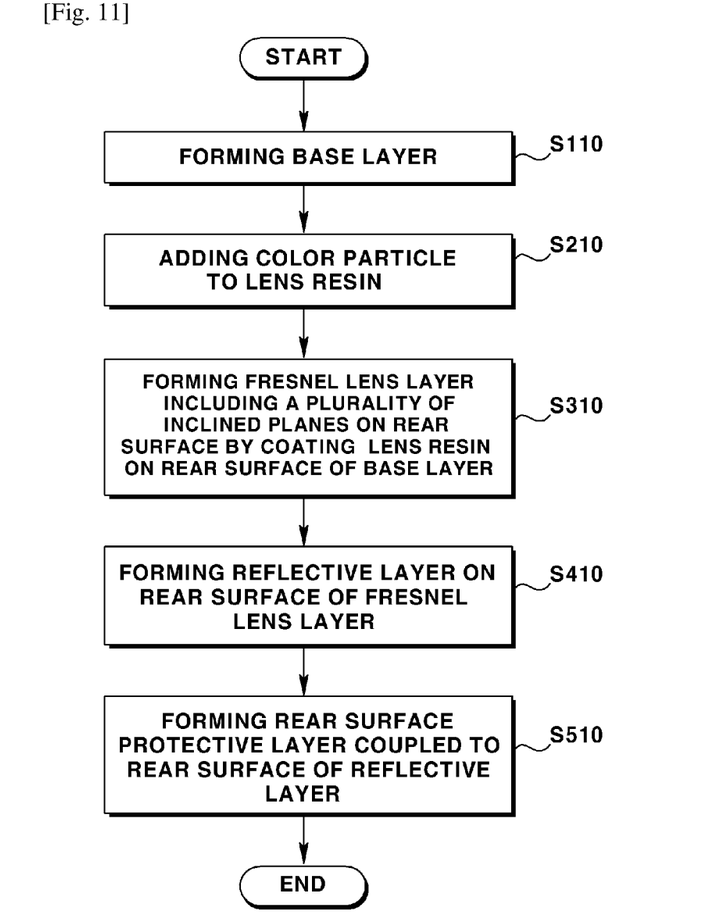
FIG. 11 is a flow chart illustrating a method for manufacturing a reflective screen according to a third exemplary embodiment of the preset disclosure.

FIG. 10 is a sectional view illustrating a reflective screen according to a third exemplary embodiment of the preset disclosure, and FIG. 11 is a flow chart illustrating a method for manufacturing a reflective screen according to a third exemplary embodiment of the preset disclosure.

The reflective screen (10) according to the third exemplary embodiment of the present disclosure may include a rear coating layer (11), a reflective layer (12), a lens base layer (13a), a lens main layer (13b), and a surface protective layer (16). As a result, the present embodiment has a structure which omits the colored layer (14) and the diffusion layer (15) from the structure of the second embodiment illustrated in FIG. 9. In the present embodiment, the lens main layer (13b) may function as both of the colored layer (14) and the diffusion layer (15).

At first, a lens base layer (13a) is provided in order to form the lens main layer (13b) (S110). The lens main layer (13b) may be formed by using a UV curable resin or a thermosetting resin. For example, a urethane acrylate resin may be used. The urethane acrylate resin has material properties such as density of 1.12, and refractive index of 1.53.

The color particle such as carbon black may be mixed with the urethane acrylate resin in order to combine the functionality of the colored layer to the lens main layer (13b) (S210). Here, a dispersing agent may be added in order to enable the carbon black to be evenly distributed in the urethane acrylate resin.

In order that the lens main layer (13b) may combine the functionality of the diffusion layer, the scattering ratio in the lens main layer (13b) may be required to be above 80%. The scattering ratio means the amount of scattered light divided by the amount of incident light. The lens main layer (13b) may include diffusion beads (15c) in order to enable the light reflected from the reflective layer (12) to be scattered.

The light passing through the lens main layer (13) may be scattered while being refracted due to the diffusion beads (15c). The reflective index difference between the diffusion beads and the lens resin forming the lens main layer (13b) is required to be above 0.03 in order to obtain sufficient diffusion effect. For example, when the lens main layer (13b) is formed by using the urethane acrylate resin if it has refractive index 1.53, the diffusion beads (15c) may have a refractive index of above 1.56 or below 1.50.

In addition, polymethyl methacrylate (PMMA) may be used as the diffusion beads (15c). The polymethyl methacrylate has a refractive index of 1.49 of which difference from the refractive index of the urethane acrylate is 0.04. Thus, the polymethyl methacrylate is capable of scattering the light to obtain the viewing angle. In addition, the polymethyl methacrylate has an advantage of low cost and that the color does not change even when used for a long period.

A lens main layer (13b) including a plurality of inclined planes may be formed by coating the urethane acrylate including the diffusion beads (15c) and the carbon black (S310). The reflective layer (12) may be formed on the rear surface of the lens main layer (13b) (S410). Afterwards, the rear surface coating layer (11) and the rear surface protective layer (16) may be formed in order to protect the screen. It is apparent that the reflective layer (12) in the present exemplary embodiment may have the same structure as the structure of the first exemplary embodiment.

Figure 12:
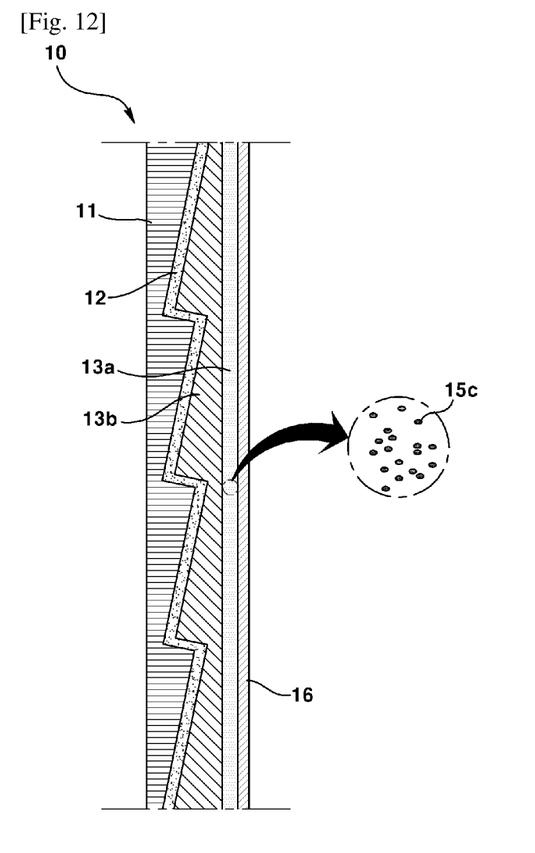
FIG. 12 is a sectional view illustrating a reflective screen according to a fourth exemplary embodiment of the preset disclosure.

FIG. 12 is a sectional view illustrating a reflective screen according to a fourth exemplary embodiment of the preset disclosure. The reflective screen (10) according to the fourth exemplary embodiment of the present disclosure may include a rear coating layer (11), a reflective layer (12), a lens base layer (13a), a lens main layer (13b), and a surface protective layer (16). In the present embodiment, the lens main layer (13b) may function as the colored layer (14), the lens base layer may function as the diffusion layer (15).

The lens base layer (13a) may be formed by coating a diffusion resin on a temporary base layer having low adhesive power. The diffusion resin refers to a synthetic resin made of a material having a characteristic to diffuse a light. The diffusion resin may be made by mixing a simple transparent synthetic resin with the diffusion beads. When the lens base layer (13a) is formed with the diffusion resin, the lens base layer (13a) may function as both of the base of the lens main layer (13b) and the diffusion layer at the same time.

The temporary base layer may be a PET file having a smooth surface. The lens base layer (13a) may be easily obtained by separating the temporary base layer after the diffusion resin is hardened when coating the diffusion resin directly without primer process.

The lens main layer (13b) may be formed on the lens base layer (13a) of which temporary base layer is separated, as described in another exemplary embodiment. Here, the lens base layer (13a) may function as the base of the lens main layer (13b). The thickness of the lens base layer may be above 100 μm in order to the support the resin forming the lens main layer (13b).

As described in the above, a carbon black may be injected to the urethane acrylate resin forming the lens main layer (13b) in order to add a color to the lens main layer (13b).

In the present exemplary embodiment, the number of layers in the layer structure of the reflective screen (10) may be reduced by enabling the lens base layer (13a) to function as both of the base of the lens main layer (13b) and the diffusion layer at the same time.

Figure 13:
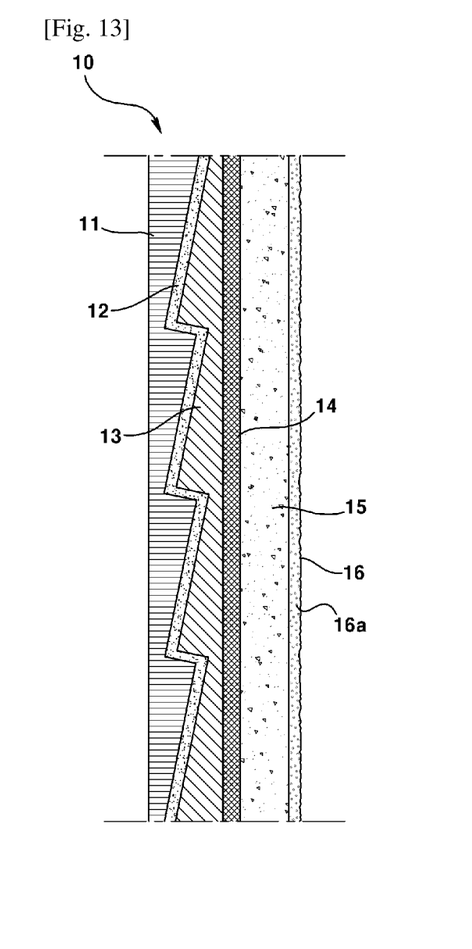
FIG. 13 is a sectional view illustrating a reflective screen according to a fifth exemplary embodiment of the preset disclosure.

FIG. 13 is a sectional view illustrating a reflective screen according to a fifth exemplary embodiment of the preset disclosure. The reflective screen (10) may include a rear coating layer (11), a reflective layer (12), a lens layer (13), a colored layer (14), a diffusion layer (15), and a surface protective layer (16). In the present embodiment, the structure with the exception of the diffusion layer (15) and a surface protective layer (16) is the same as the structure of other exemplary embodiment. Thus, the diffusion layer (15) and a surface protective layer (16) will be mainly described.

The surface protective layer (16) may be formed on the outermost surface of the reflective screen (10). The surface protection layer (16) may be formed by coating on the surface of the diffusion layer (15). The surface protective layer (16) may be formed by a various method including a wet coating and a spray method. The surface of the surface protective layer (16) may have a hardness of above 2H by the standard of Vicker s hardness. According to the present exemplary embodiment, the surface protective layer (16) may be formed by a wet coating.

Here, the surface protective layer (16) generally performs the following two functions.

First, the surface protective layer (16) may protect each of the layers forming the reflective screen (10) against the external shocks such as scratch by having a solid surface hardness as described above.

Second, the surface protective layer (16) may diffuse the incident light by including an uneven concavo-convex part. Not only the light emitted from the projector (20), but also the external light such as an interior lightening may be incident to the reflective screen (10). Such the light may be reflected on the hard coating layer and be delivered to the viewer, in the case where the hard coating layer is disposed at the outermost part as in the conventional projector screen.

Especially, the comparatively bright image among the images emitted from the projector may be reflected on the hard coating layer and be projected on the ceiling (C, in FIG. 2) That is, the 'flash on the ceiling' phenomenon may occur.

However, according to the present exemplary embodiment, the incident light may be reflected by being divided into various ways as illustrated in FIG. 2, because the light is diffused or scattered on the surface of the surface protective layer (16). Thus, the 'flash on the ceiling' phenomenon does not occur.

The surface protective layer (16) may include an uneven surface. In addition, as illustrated in FIG. 13, the surface protective layer (16) may includes inside thereof impurities (16a) to diffuse a light. Therefore, the surface protective layer (16) may also function as the diffusion layer. That is, the surface protective layer (16) may perform the functionality of internal diffusion by using the refractive index difference between the resin forming the coating material and the impurities (16a) such as beads.

Meanwhile, the method to form the uneven concavo-convex part on the surface as described in the above may be performed in a various ways.

For example, the uneven concavo-convex part on the surface may be formed by the impurities (16a). In addition, the concavo-convex part of the surface protective layer may be formed by mold shaping a resin material having plasticity.

At this moment, the haze by the surface diffusion may be above 10%, and the total haze including the internal diffusion effect may be above 80%. Here, the haze means a degree of diffusion of the light passed through a certain medium. The haze may be expressed as a ratio of diffuse transmittance divided by total transmittance.

When the surface protective layer has a sufficient haze, the diffusion layer (15) may transmit the light with diffusing the light, in spite of the name thereof.

The diffusion layer (15) may be formed of a light transmitting material. Preferably, the diffusion layer (15) may be formed of a PET (polyethylene terephthalate) material. However, the material forming the diffusion layer (15) is not limited hereto. Any material which may transmit the light such as glass or acryl may be used for the diffusion layer (15).

In addition, the diffusion layer (15) is not necessarily required to transmit the light closely to the 100% transmittance. The diffusion layer may have a lower transmittance. It is apparent that the diffusion layer (15) in the present exemplary embodiment may diffuse the light and may include the diffusion beads like the other exemplary embodiments.

A display device may be composed by combining the reflective screen with a projector or any other image projecting device. Such display device may prevent thermal strain, flexion, and distortion due to environmental factors such as temperature, humidity. In addition, the display device has outstanding properties such as high stiffness, smoothness, light weightness, non-combustibility, and durability.

Especially, the 'flash on the ceiling' phenomenon where the image of the screen is projected on the ceiling (C) (in FIG. 2) may be prevented, because the surface protective layer (16) may diffuse and reflect not only the light from the projector (20) but also the external light including the interior lightening. As a result of an experiment, the reflective screen (10) including the surface protective layer (16) according to the present exemplary embodiment may reflect the light onto the ceiling (C) in the amount of 28 lux which is significantly lower than the illumination of the conventional screen of 113 lux. The result may be sufficiently understood that the 'flash on the ceiling' phenomenon is resolved.

The abovementioned exemplary embodiments are intended to be illustrative, and not to limit the scope of the claims. Many alternatives, modifications, variations, and equivalents will be apparent to those skilled in the art. The features, structures, methods, and other characteristics of the exemplary embodiments described herein may be combined in various ways to obtain additional and/or alternative exemplary embodiments. Therefore, the technical scope of the rights for the present disclosure shall be decided by the claims.

The invention claimed is:

1. A reflective screen comprising: a lens layer having a plurality of inclined planes formed at a rear surface of the lens layer; a diffusion layer formed on a front surface of the lens layer; and a reflective layer formed on the plurality of inclined planes, wherein the reflective layer is formed whereby metal flakes with high aspect ratio are coated on the lens layer, wherein the reflective layer is formed by applying a spray solution containing the metal flakes to the rear surface of the lens layer, wherein a solvent of the spray solution includes a polar solvent or a lubricating oil, and wherein inclination angles of the plurality of inclined planes are different from each other, wherein the spray solution contains a content of the metal flake in a ratio of 10% to 15%, wherein the spray solution further includes a binder, and wherein the binder includes one selected from a group consisting of cellulose series and urethane series.

2. The reflective screen of claim 1, wherein an aspect ratio of each of the metal flakes is above 100.

3. The reflective screen of claim 1, wherein the metal flakes are made of an aluminum material.

4. The reflective screen of claim 1, further comprising:
- a rear surface coating layer laminated to cover the reflective layer; and
- a surface protective layer laminated to cover the diffusion layer.

5. The reflective screen of claim 1, wherein the lens layer is formed of a Fresnel lens of which a center is disposed in a lower part.

6. A display device comprising:
- a projector composed by either one of a CRT (Cathode Ray Tube) projection method, LCD (Liquid Crystal Display) projection method, LCoS (Liquid Crystal On Silicon) projection method, or a DLP (Digital Light Processing) projection method; and
- the reflective screen to reflect an image from the projector according to claim 1.

* * * * *